United States Patent
Gao et al.

(10) Patent No.: US 9,282,296 B2
(45) Date of Patent: Mar. 8, 2016

(54) CONFIGURATION TOOL FOR VIDEO ANALYTICS

(71) Applicants: Xiang Gao, Skillman, NJ (US); Vinay Damodar Shet, Princeton, NJ (US); Xianjun S. Zheng, Plainsboro, NJ (US); Sushil Mittal, Edison, NJ (US); Mayank Rana, Jersey City, NJ (US); Maneesh Kumar Singh, Lawrenceville, NJ (US); Bernhard Agthe, Feldkirchen (DE); Andreas Hutter, Munich (DE)

(72) Inventors: Xiang Gao, Skillman, NJ (US); Vinay Damodar Shet, Princeton, NJ (US); Xianjun S. Zheng, Plainsboro, NJ (US); Sushil Mittal, Edison, NJ (US); Mayank Rana, Jersey City, NJ (US); Maneesh Kumar Singh, Lawrenceville, NJ (US); Bernhard Agthe, Feldkirchen (DE); Andreas Hutter, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 13/693,231

(22) Filed: Dec. 4, 2012

(65) Prior Publication Data
US 2013/0147961 A1    Jun. 13, 2013

Related U.S. Application Data

(60) Provisional application No. 61/567,742, filed on Dec. 7, 2011.

(51) Int. Cl.
*H04N 7/18* (2006.01)
*H04N 5/77* (2006.01)
*G08B 13/196* (2006.01)

(52) U.S. Cl.
CPC ............ *H04N 7/181* (2013.01); *G08B 13/1968* (2013.01); *G08B 13/19645* (2013.01)

(58) Field of Classification Search
USPC .................................. 386/223–229; 348/159
See application file for complete search history.

(56) References Cited

U.S. PATENT DOCUMENTS

| 8,274,564 | B2 * | 9/2012 | Girgensohn et al. | 348/159 |
| 8,817,102 | B2 * | 8/2014 | Saeki et al. | 348/154 |
| 2010/0110183 | A1 * | 5/2010 | Bobbitt et al. | 348/143 |
| 2011/0143779 | A1 * | 6/2011 | Rowe et al. | 455/456.3 |

FOREIGN PATENT DOCUMENTS

EP         0729275 A2        8/1996

OTHER PUBLICATIONS

VideoInsight, "Configuration Activities," Webpage, http://www.video-insight.com/Products/Configuration.aspx, Oct. 25, 2012.
PCT International Search Report mailed Mar. 7, 2013 corresponding to PCT International Application No. PCT/US2012/068153 filed Jun. 12, 2012 (9 pages).

* cited by examiner

*Primary Examiner* — Nigar Chowdhury

(57) ABSTRACT

Multiple cameras are configured for use in video analytics. A single configuration tool is provided. The interrelationships between cameras are included within the configuration. Using a combination of text entry fields, registration of the cameras on a floor or other map, and marking on images from the cameras, an efficient workflow for configuration may be provided.

12 Claims, 8 Drawing Sheets

CONFIGURATION TOOL FOR VIDEO ANALYTICS

RELATED APPLICATIONS

The present patent document claims the benefit of the filing date under 35 U.S.C. §119(e) of Provisional U.S. Patent Application Ser. No. 61/567,742, filed Dec. 7, 2011, which is hereby incorporated by reference.

BACKGROUND

The present embodiments relate to video analytics. In particular, configuration of multiple cameras is provided for video analytics.

In order to meet the increasing needs of the security and safety, surveillance systems are becoming more complex. Besides the basic capabilities of video surveillance, such as recording and playback, video analytics technologies are used to enrich the functionality. A person or vehicle may be detected and tracked, events may be detected, an alarm may be triggered, and/or forensic searching may be provided.

In order to achieve accurate performance in terms of detection and false alarm rate, every camera needs to be configured properly. The camera configuration task varies based on the different functionalities. Camera configuration is time consuming. For example, a tunnel monitoring system monitors traffic flow and generates events, such as slow vehicle, stopped vehicle, traffic jam, wrong directional driver, and pedestrian detection. An experienced worker may need about eight minutes to configure a camera, during which the worker may click the mouse buttons more than 100 times. With forty cameras for every mile inside the tunnel, 5.5 hours and 4000 mouse clicks are needed to configure the cameras for every mile.

For indoor people detection and tracking functionalities, configuration tools are typically provided for a single camera. As a person travels from the field of view of one camera to the field of view of another camera, the person is re-identified. The facial recognition or other detection is performed again. To configure a typical site with 40 cameras, a worker may click 120 times to define camera positions and more than 150-600 times overall to define the calibration planes for all of the cameras.

SUMMARY

Systems, methods and computer readable media are provided for configuring for video analytics. A single configuration tool is provided for configuring multiple cameras. The interrelationships between cameras are included within the configuration. Using a combination of text entry fields, registration of the cameras on a floor or other map, and marking on images from the cameras, an efficient workflow for configuration may be provided.

In a first aspect, a method is provided for configuring for video analytics. A processor registers cameras relative to a map in response to first inputs from a user input of locations on a map. For each of the cameras, the processor defines, in response to second input from the user input on an image from the camera, a region. The processor receives a relationship between two or more of the cameras in response to third input from the user input. A configuration that is a function of the location relative to the map, the region, and the relationship is stored for each of the cameras.

In a second aspect, a non-transitory computer readable storage medium has stored therein data representing instructions executable by a programmed processor for configuring for video analytics. The storage medium includes instructions for generating a first user interface with representation of multiple cameras, receiving selection, from the first user interface, of ones of the cameras in a sequence, presenting, for each camera in the sequence of the cameras, a series of additional user interfaces corresponding to configuration steps, the additional user interfaces provided in a same configuration tool as the first user interface, and creating a configuration for each of the cameras, the configuration created from inputs responsive to the additional user interfaces.

In a third aspect, a system is provided for configuring video analytics. A plurality of cameras is distributed in a region. A display is operable to output a user interface. A user input is operable to receive configuration information from a user in response to the user interface. A memory is configured to store a configuration for each of the cameras. A processor is configured to cause the user interface to include a map of the region indicating locations for the cameras, a view from a selected camera of the plurality of cameras, and text listing the cameras. The processor is further configured to receive selection of each of the cameras, receive input of the configuration information for each of the selected cameras, and generate the configuration as a function of the selection and configuration information.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

A workflow driven configuration tool is provided for video analytics or surveillance systems. The number of mouse clicks needed for configuration of multiple cameras may be reduced while providing sufficient and accurate information about the camera. By providing an intuitive graphic user interface presentation, the video system may be more efficiently configured than a system designed for configuring individual cameras. The configuration and corresponding graphic user interface presentations include camera registration in a floor map. The camera position and area of camera coverage (e.g., field of view) are labeled as part of registration using the map. For each camera, regions are defined on an image from the camera. A traffic region may be painted or outlined on the image, and hotspots for event triggers identified with simple polygons over the traffic region. For example, the hotspots define valid places (e.g., hallways or doors) that a person could enter or leave the view. The image may also be used to indicate scale by placement of height designators at different depths represented in the image. The inter-camera relationship is also defined on the image from the camera or the map. For example, common areas covered by other cameras are painted, and/or lines are placed to indicate boundaries or ingress/egress locations associated with another camera.

The configuration is performed for any type of video surveillance system. The video surveillance system is for security, safety, traffic monitoring, and/or other monitoring. Video analytics are provided by the surveillance system to detect, track, monitor, or secure. In the example discussed herein, the configuration is for a video surveillance system used for forensic searching or a multi-camera indoor people detection and tracking system. The video surveillance system may alternatively be for monitoring roadways or vehicle traffic.

Figure 1:
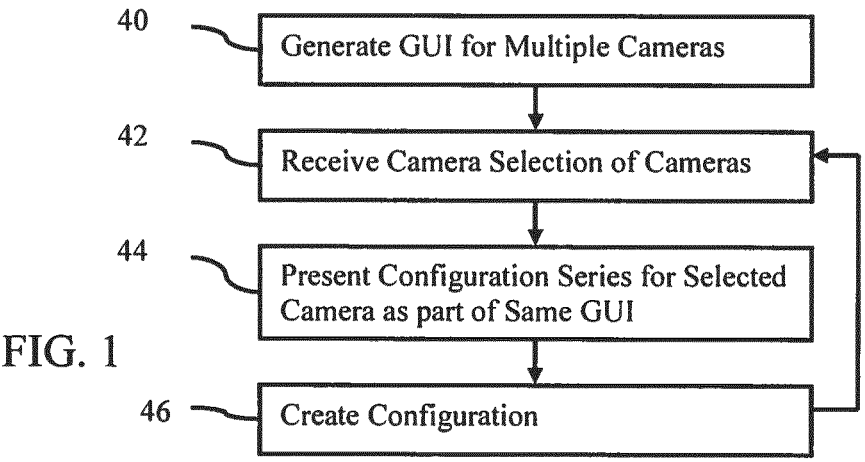
FIG. 1 is a flow chart diagram of one embodiment of a method for configuring, with one tool, multiple cameras for video analytics.
Figure 2:
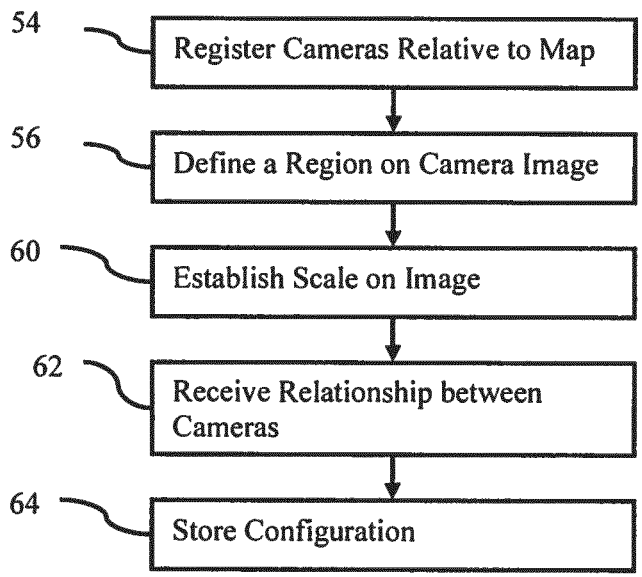
FIG. 2 is a flow chart diagram of another embodiment of a method for configuring multiple cameras for video analytics.

FIG. 1 shows a method for configuring for video analytics. Using a series of graphic user interfaces, multiple cameras are configured using one tool. FIG. 2 shows a method for configuration related to camera specifics implemented with the series of graphic user interfaces of FIG. 1 or other workflow. FIGS. 3-8 show example graphic user interfaces used in the configuration of FIG. 1, FIG. 2, or another configuration workflow.

Figure 9:
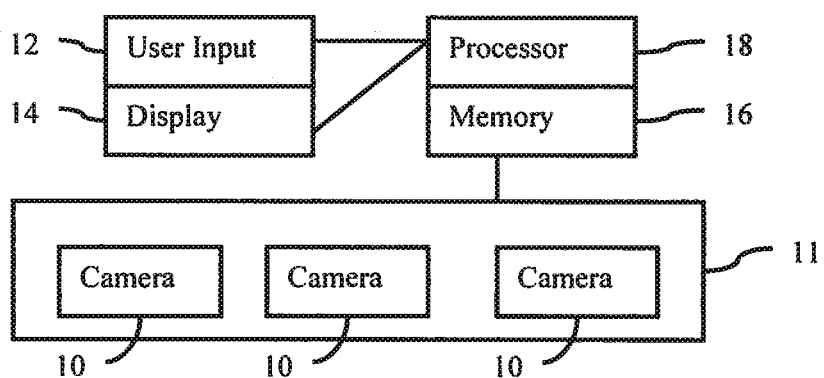
FIG. 9 is a block diagram of one embodiment of a system for configuring cameras for video analytics.

The method of FIG. 1 is implemented by the system of FIG. 9 or another system. The method is provided in the order shown, but other orders may be provided. For example, act 42 may trigger act 40, so may be performed prior to act 40. Additional, different or fewer acts may be provided. For example, act 42 is automated so that the selection is not received from a user, but is automatically provided by a processor. As another example, act 40 is not provided. Instead, the configuration tool sequences through the cameras without providing a graphic user interface for multiple cameras.

In act 40, a user interface is generated. The user interface is generated as part of a tool, engine, or coding for camera configuration. A processor uses an operating system, http, flash, and/or other resource to generate a display and link parts of the display with user selectable options using a user input. Dialog boxes, soft buttons, selectable menus, drop downs, icons, tools, or other user input options are incorporated into the graphic user interface. Text, graphics, video, images, and/or other display components for communicating information are included on the graphic user interface.

Figure 3:
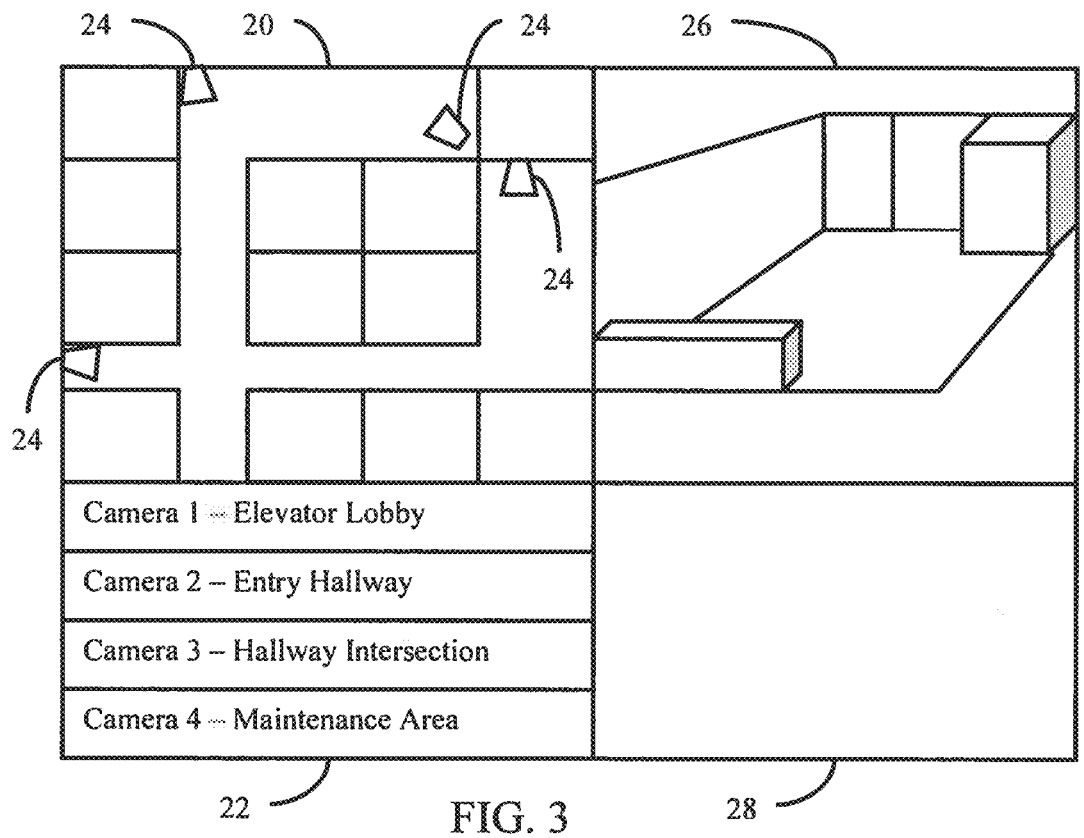
FIG. 3 illustrates an example graphic user interface for a registration stage of configuration.

The user interface is generated with a representation of multiple cameras. Any representation may be provided. FIG. 3 shows two examples of multi-camera representation. In the first example, a map is displayed in a map region 20. The map includes icons 24 representing cameras and their corresponding locations. Images of the actual cameras, annotations, or other designators showing the cameras on the map may be used.

The map is a floor map. The map represents a layout of rooms and/or other areas in a building. Tabs or lists may be provided for switching between different floors. Maps of other types of regions may be used, such as a topographical, traffic, walking, commuting, or three-dimensional rendered map.

The map may include other information and/or objects. For example, user input components, such as soft buttons or default icons, are provided. A camera may be displayed adjacent to the map for clicking and dragging onto the map to add cameras. Dialog or other inputs for annotating the map and/or cameras may be provided on or by the map.

In a second example of multi-camera representation, the cameras are represented in a text list in a list region 22. The list includes annotated or descriptive names for the cameras. Alternatively or additionally, other designators, such as a serial number, communications port number, or other assigned indicator for the camera rather than the location are provided.

The list may include a dialog box or other user input graphic. The user may rename a camera using the dialog box. Soft buttons for sorting or other list functions may be provided.

The list may be linked with the map. Selection of a camera on either may result in highlighting the same camera in the other. For example, selecting a camera icon 24 on the map highlights the same camera on the list. As another example, adding a camera to the list results in an unattached camera icon 24 being placed on or adjacent to the map. The user may then place the camera icon 24 on the map.

The graphic user interface also includes an image region 26 and corresponding function region 28. The image region 26 shows a recorded (e.g., stored) or real-time (e.g., current) image from a selected or the last selected camera. The image is a snapshot, still image, or part of an on-going video stream from the camera.

The function region 28 includes user input options, but may include lists or other information. Dialog boxes for inputting information, buttons for activating tools or functions, buttons for selecting, dials, or other inputs are provided. The input may be for any of various functions associated with the map, the camera list, the image region 26, or other aspects of the configuration or graphic user interface. For example, buttons associated with painting, placing a polygon, or other graphic input are provided for the image region 28 in the function region 28.

The four regions (e.g., map 20, text list 22, image 26, and function 28) are displayed in any arrangement. The regions have the same or different sizes. The arrangement and/or relative sizing may vary or stay the same as the workflow for configuration proceeds.

Additional, different, or fewer regions may be provided. For example, the text list region 22 is initially displayed without the other regions. The text list region 22 may have the position shown in FIG. 3 or be shifted, such as being the full display or being in the top left. Map activation may be provided in the function region 26 for generating or adding the map region 20 to the graphic user interface. Alternatively, selecting a camera or a region (e.g., "second floor") from the list may result in the corresponding map being displayed in the map region 20 and an image in the image region 26. The order of adding regions from the user perspective may be different, such as starting with the map region 20. In response to selecting a map, the camera list region 22 is added. In response to selecting a camera, the image region 26 is added.

As another example, a task bar lists the steps of the workflow for configuring a camera and indicates the current progress. A graphical representation of which cameras have been configured may be provided. In yet another example, the configuration data is displayed. Where the configuration is stored as an XML file, the XML data may be displayed. Navigation inputs may be provided, such as "next" or "back" buttons to guide the user through the series of steps for configuring one or more cameras.

The graphic user interface is presented as a persistent page with changing information during the configuration. A single tool is provided to navigate through the configuration of multiple cameras.

The graphic user interface is for initial configuring, such as by adding cameras to a template. Alternatively or additionally, the graphic user interface is for reconfiguring. The information for already performed configuration is loaded and presented. The user then alters the configuration, such as altering a configuration of a given camera, adding a camera and configuration to a configured system, and/or removing a camera and configuration.

Referring again to FIG. 1, a camera selection is received as part of the configuring in act 42. The graphic user interface is used to select different cameras at different times. The user may select a specific camera. The camera is selected from the textual list 22 or as a camera icon 24 on the map. Multiple cameras are indicated, and one of the multiple cameras is selected (e.g., moving a cursor over the camera icon 24 and clicking). Alternatively, selecting a next or completing a task in the workflow may automatically result in selection of another camera.

By selecting different cameras serially, the cameras of the sequence are configured using the graphic user interface. A sequence of steps in a workflow cycles through the cameras to assist in configuring the cameras of the surveillance system. Configuration information may be pre-populated using map analysis, image analysis, or a template so that the user confirms or adjusts the configuration.

In act 44, a series of additional user interfaces are presented to the user once a camera is selected. As the user completes tasks in configuring a camera, the results of the completed task are integrated into the graphical user interface and/or the graphical user interface transitions to a next task. The next task may necessitate different user input options and/or information. The configuration tool transitions to the next user interface. The same series of user interfaces may be presented, such as providing the same series for each camera through a sequence of cameras. Some information is the same or different for different cameras, such as the format of the layout being the same but the image and textual description being different.

The same configuration tool provides the series of graphical interfaces for configuring the cameras. The same page may be displayed, but with different content based on the task to be completed. For example, the user selects a camera in act 42. As a result, the image region 26 is populated with an image from the camera. Other information about the camera, such as a current configuration and/or annotations, may also be added. This transition of the graphical user interface provides the additional information of the camera view to assist in the next task, such as designation of a region on the image.

Other transitions are described below for FIG. 2. An example transition includes adding graphics to the map region 22. For example, a direction of a field of view is shown in response to user entry of the direction on the map. As another example, a paint tool and/or polygon entry tool for the image is added when the user interface transitions to configuring regions associated with the camera. In another example, one or more height icons are displayed when transitioning to a scale setting task in the workflow.

In act 46, a configuration is created for each of the cameras. In response to the information input using the graphical user interfaces of the configuration tool, a configuration is created for each camera. The configuration is information about various characteristics of the camera. The information may be by reference to a table or database or may be settings or values for different parameters. For example, metadata is generated for a location of the camera, a pedestrian zone within the camera field of view, one or more event areas of the pedestrian zone, a scale, and a relationship with no, one or more other ones of the cameras. Additional, different, or less information may be generated.

XML or other schema may be used. One example XML file for a camera may include a camera identifier, a camera feed or stored image information, the location relative to the map or other origin, a region within the image (e.g., a floor), hotspots or event regions (e.g., entry and exit points), a scale setting, and inter camera connections or any relationships with other cameras. Any types of values or settings for these parameters may be used, including additional, different, or less information. In other embodiments, additional, different, or fewer configuration variables are used. The variables used may depend on the type of analytics performed by or for the surveillance system.

In one embodiment, the information for each camera is stored as a separate file or separate group of values. The configurations for multiple cameras may be grouped into a single file or otherwise combined.

The configuration is created by the configuration tool. In response to user input, the data for storing is generated. The configuration tool walks the user through the configuration of multiple cameras while creating configuration information for each of the cameras. Using graphics and interaction between different regions of the user interface, the configuration may be efficiently created. The number of clicks or amount of user interaction may be limited due to use of map and text list linking, input on the image (e.g., painting and polygon creation on the image to define regions of interest and hotspots), and mapping interrelationship with other cameras.

FIG. 2 shows a method for configuring for video analytics. The method represents an example workflow for configuring cameras of a surveillance system. In the example workflow, the cameras are configured for detection and tracking. To simplify tracking, the locations where traffic occurs, the more specific locations of events (e.g., entry or exit), and linking to other cameras are input for configuration. For other video analytics, different information may be provided. Additional, different, or fewer acts may be used.

The acts are performed in the order shown or a different order. For example, a region may be defined on a camera image in act 56 and/or scale established in act 60 prior to registering the camera to the map in act 54. As another example, the relationship to other cameras of act 62 may be received prior to the image-based acts 56 and 60.

There are three ways to allow users to configure the system: 1) the user manually configures the system using the user-machine interaction; 2) automated algorithms bootstrap the configuration (e.g. floor plan, scale geometry, hotspots etc) by analyzing the scene, contents (e.g. objects moving, interaction inside the scene) of the scene, and user verifies the configuration; or 3) the user starts to configure the system and algorithms assist the configuration and verify the configuration is correct.

To begin the workflow, the user initiates the configuration tool. The user may navigate to a configuration website in a client-server environment. The user may run a configuration tool program in a local environment. Other techniques for initiation may be used.

The workflow may begin with the graphical user interface of FIG. 3 or a different user interface. For example, a list of XML files is presented. Each XML file is for a region, such as a floor, associated with a facility or surveillance system. Information for multiple cameras may be associated with the XML file. Other listings than files may be presented to navigate to a given set of cameras and/or map. Preview panes for the XML file and an associated map may be provided. A list of steps or a current step to be performed may be indicated, such as "select a camera to be configured." If the user selects an XML file from the list for a given region, the corresponding map and XML data are displayed in the preview panes. Given this information, the user may be prompted to the next step, such as by a "next" button or highlighting the next step in the indicated workflow. Alternatively, the configuration tool progresses to the next action based on completion of a previous step.

For the next step, the graphic user interface transitions to the one shown in FIG. 3, without the image in the image region 26. The existing configuration information for the selected region is provided on the graphical user interface. Other arrangements or orders of bringing up the graphical user interface for configuring a particular camera may be used.

In act 54, the cameras are registered relative to the map. Registration relative to the map may include location, direction, field of view or combinations thereof. For example, in response to user inputs, the processor determines a location for a camera on the map. The user selects a camera or series of cameras associated with the map. The selection may be by selecting a specific camera or by transition through a sequence of cameras.

The selection of a camera prompts entry, if not already done, of a label for the camera. A dialog box is presented to the user. The user inputs an annotation for the camera, such as a textual description of the location viewed by the camera. A drop down menu of descriptions or other input may be used instead. In the example of FIG. 3, camera 1 is labeled "elevator lobby" in the text list region 22. Annotation in the map region 20 may alternatively be used.

The selection of the camera and/or completion of labeling prompt setting a position of the camera relative to the map. The user inputs map coordinates, clicks at a location on the map, and/or drags a camera icon 24 to a location on the map. To assist the user in locating the camera, the image from the camera is displayed in the image region 26. Other techniques for positioning the camera relative to the map may be provided.

For a new camera, the camera may be added by clicking a camera icon 24 adjacent the map, selecting a point on the map, selecting an "add camera" entry, selecting an undefined or unconfigured camera, or otherwise activating addition. For example, an add camera dialog is provided. The user inputs the camera position or drags an undefined camera icon 24 to the desired position. A list of images may be presented to allow association of the camera icon 24 with a specific camera. The user selects the image from a group of thumbnails, from among a plurality of simultaneously displayed images, or from a sequence of images to indicate the actual camera being associated with the placed camera icon.

For already associated cameras, the user may alter the text and/or position. Selection of the camera allows for editing the existing configuration.

As positioned, the new camera has an assumed orientation. For example, the camera orientation is assumed to be upwards (e.g., north) on the map. Other assumed orientations may be provided. An already configured camera may also have an orientation.

Figure 4:
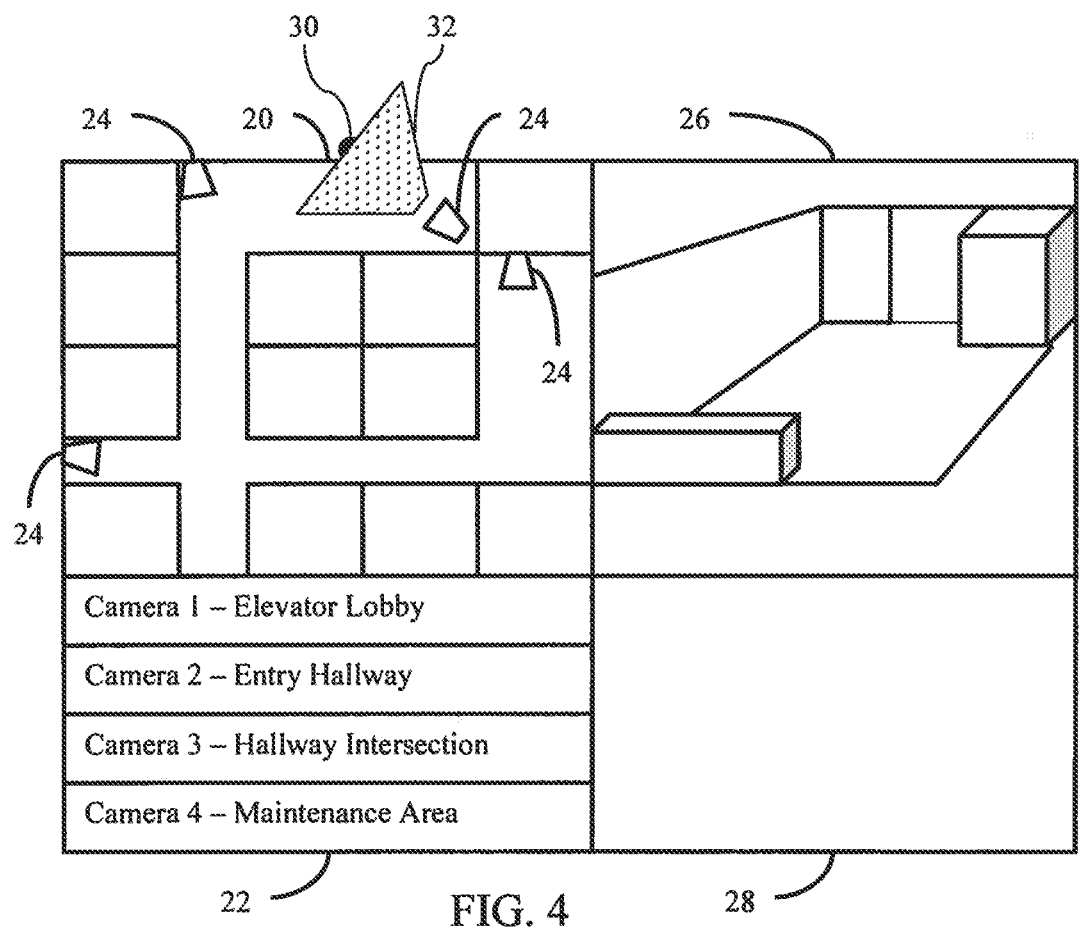
FIG. 4 illustrates an example graphic user interface for another registration stage of configuration.

As part of registering the camera, the orientation is defined by the user. An indication of a view direction is received for each of the cameras icons 24 on the map while the image for the camera is displayed with the map. FIG. 4 shows an example of inputting an indication of orientation. The user visually inspects the image from the camera to determine the orientation or may otherwise know the orientation. The user inputs a direction on the map relative to the camera icon 24. For example, the user selects a point, represented as the circle 30 in FIG. 4. Using the point 30 as a center of the field of view, the direction of the field of view is provided. The point may represent an edge or other location in the field of view.

By selecting the point 30, the field of view of the camera is defined. A graphical representation 32 of the field of view may be positioned. The depth of the field of view may depend on the location of the point 30. The width and/or depth of the field of view may be selectable, standardized to the type of camera, or general. The field of view is a general representation rather than an exact indication. In other embodiments, LIDAR, image processing, or other process is used to determine an exact field of view and represent the exact field of view on the map.

In alternative embodiments, the field of view representation 32 is presented. The user then drags and/or alters the field of view representation 32 to provide the orientation and/or general spatial extent of the field of view of the camera.

Other registration acts may be provided for a given camera. In response to completion of registration, the workflow progresses to defining a region in act 56. Alternatively, additional cameras are registered before defining regions for the cameras.

In act 56, one or more regions are defined for each of the cameras. The regions are defined on the image from the respective camera. Rather than or in addition to defining the region on the map, the image is used. The processor, in response to input from the user on the image, defines a region. Any user input may be used. For example, a paint tool is used. A brush, pencil, or other implement is graphically represented. The user positions the implement and activates. In response, a line or brush stroke may be painted onto the image. Alternatively, an outline is created and filled. In other embodiments, one or more polygons are placed, sized, warped, or otherwise adjusted to represent the region. In other embodiments, image analysis is applied to find the interior wall—floor intersection. The detected floor region used as the region.

Figure 5:
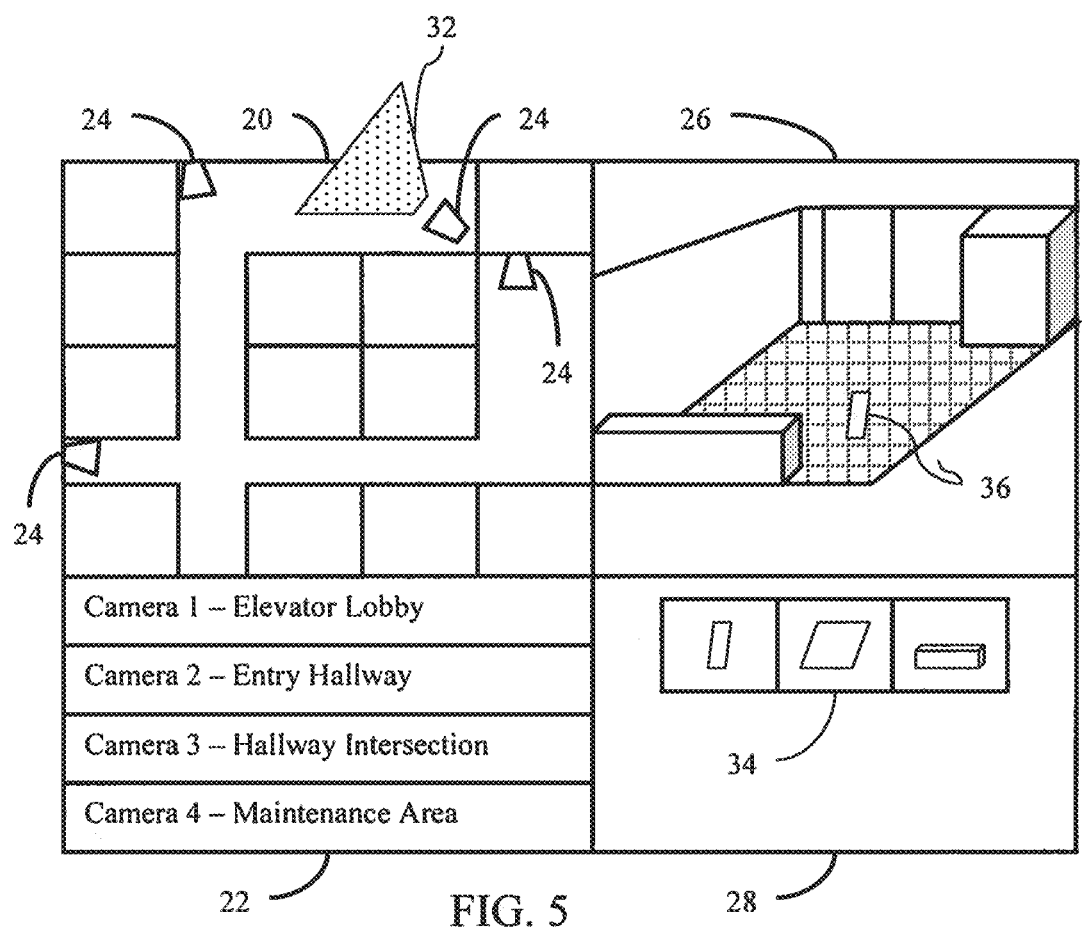
FIG. 5 illustrates an example graphic user interface for a region definition stage of configuration.

In one embodiment represented in FIG. 5, the user positions a pointer with the brush tool 36 activated. The tool is selected from a list of available paint tools 34. The user paints the region of interest in the image. In the example of FIG. 5, the video analytics system operates, in part, based on the locations of traffic. The floor surface is painted, as represented by the dotted cross-hatching. The user brushes the tool 36 across the floor surface. The painting may be detailed, such as using magnification, or may allow for some "slop" or coloring outside the lines. Other regions may be designated for other video analytics.

In another embodiment, one or more hotspots are defined. The hotspots are locations associated with the video analytics. In one example, the hotspots are entry and exit locations of the field of view of the camera. In other examples, the hotspot is additionally or alternatively a location where a person, license plate, or other distinguishing feature is more likely viewable by the camera. Other hotspots depending on the type of analytics performed may be used.

Figure 6:
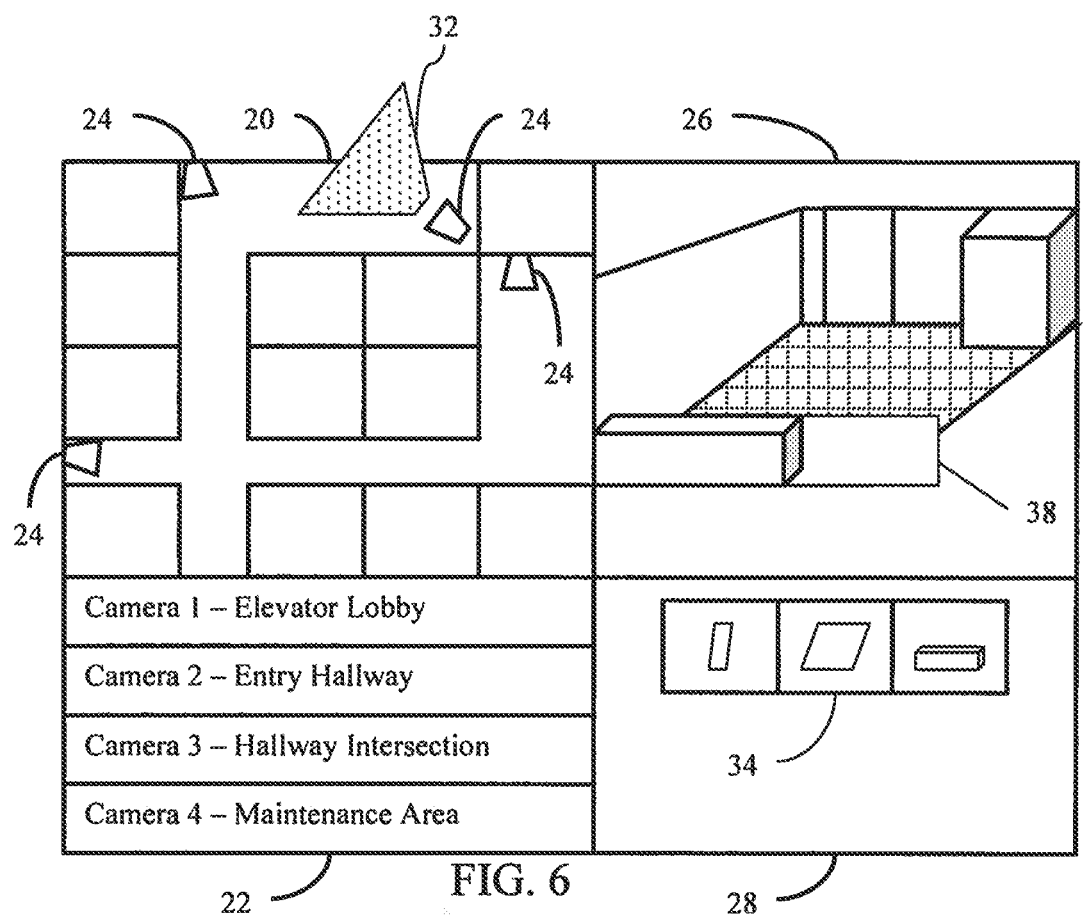
FIG. 6 illustrates an example graphic user interface for another region definition stage of configuration.

The hotspots are entered on the image, but may be alternatively designated on the map. The user defines the hotspot using the paint tool. In another embodiment represented in FIG. 6, one or more polygons are entered. The user selects a shape tool 34. Using the cursor and clicking, the user positions and sizes a polygon 38 on the image. The polygon 38 is positioned at the desired hotspot. In the example of FIG. 6, the polygon 38 is at a location where people may enter or exit the field of view of the camera.

The hotspot is defined in conjunction with the region of interest, such as the floor. Rather than defining a complex shape by painting or tracing, the intersection of the polygon 38 with the region of interest defines the hotspot. Where the region of interest was painted, the edges of the region of interest within the polygon 38 provide for a more complex hotspot shape. Alternatively, the hotspot may be generally designated such that the polygon alone is used. In other embodiments, the hotspots are designated as points, lines, painted areas, or traced areas.

Since the hotspot uses an intersection with the floor surface, the hotspot is defined relative to where a person's foot position would be when an event occurs. The hotspot is a virtual floor mat for the camera. In alternative embodiments, the hotspot may be defined relative to facial, head, or other positioning of observed people or vehicles.

Additional hotspots may be added. For each hotspot, a dialog box may be presented to label the hotspot. For example, a text entry field is provided in the function region 28 for inputting a description of the hotspot. Some text may be automatically generated, such as "camera 4—maintenance area." The user then indicates the hotspot name, such as "hallway A." As additional hotspots are created, a list of hotspots is provided. Other properties than the description label may be input, such as a type label (e.g., entry point, exit point, or door).

In alternative embodiments, one or more hotspots are automatically generated. The map may be used to indicate locations of interest. For example, the map is processed to identify walls, walkways, doors, rooms, and/or other structure. Based on the structure, the locations of entry and exit are identified. Using the field of view representation 32 and/or image processing based on the floor region, the intersection of the event locations with the field of view is determined. Image processing may be performed on the image to determine the building structure in the image for segmenting the hotspot within the image based on the location of the camera and field of view.

Tracking moving objects may be used to automatically detect hotspots. The locations, such as foot locations, at which people appear or disappear in a field of view or scene from a camera are detected. The density of these occurrences may indicate a hotspot. By smoothing the motion trajectories of each tracked object, the resulting density function may be more accurate.

Kernel density estimates of these locations are mapped. The contours of the appearance and disappearance (density function) represent hotspots. In one embodiment, the Epanechnikov kernel is used for density estimation over the foot locations. Assume no roll in orientation of the camera, the depth may be treated as aligned with the y axis of the image from the camera. The horizontal and vertical bandwidths of the kernel are determined using the widths (w) and heights (h) of the person in the image. The horizontal bandwidth $R_x$ is computed by plotting w as a function of the image y location. A line is fit to this data to compute the value of $R_x$ that increases smoothly with y. The vertical bandwidth $R_y$ is computed by plotting $w^2/(h-w)$ as a function of the image y location. A line is fit to this data to compute the value of $R_y$ that increases smoothly with y. The kernel density is computed at every point in the image and displayed as heat map where a threshold density and/or region of sufficient size is treated as possible hotspot.

Filtering may be provided to limit the number of automatically detected hotspots. For example, all possible hotspots with a height/width ratio less than 1.5 or greater than 3.5 are removed. Any redundant possible hotspots may be removed. The user then selects the hotspots or the selection is automated and the user labels the hotspots. Other density and/or tracking based functions may be used to identify hotspots.

By using semi-automatic or automatic hotspot detection, a more thorough identification of hotspots may be provided. The user may be less likely to miss a door or other transition location where automated assistance is provided. Automation of hotspot detection may also may configuration more efficient.

Referring again to FIG. 2, the scale of the image is established in act 60. In response to user input, the processor determines the scale of the image. The image is calibrated for performing the video analytics. To determine the scale, the height of a representative object or objects is marked in the image. For example, the user indicates one or more points in the image and inputs a height value for each. As another example, the user selects a location along a wall at an estimated desired height. Using multiple height indications in the same image, the scale for different depths is determined.

Figure 7:
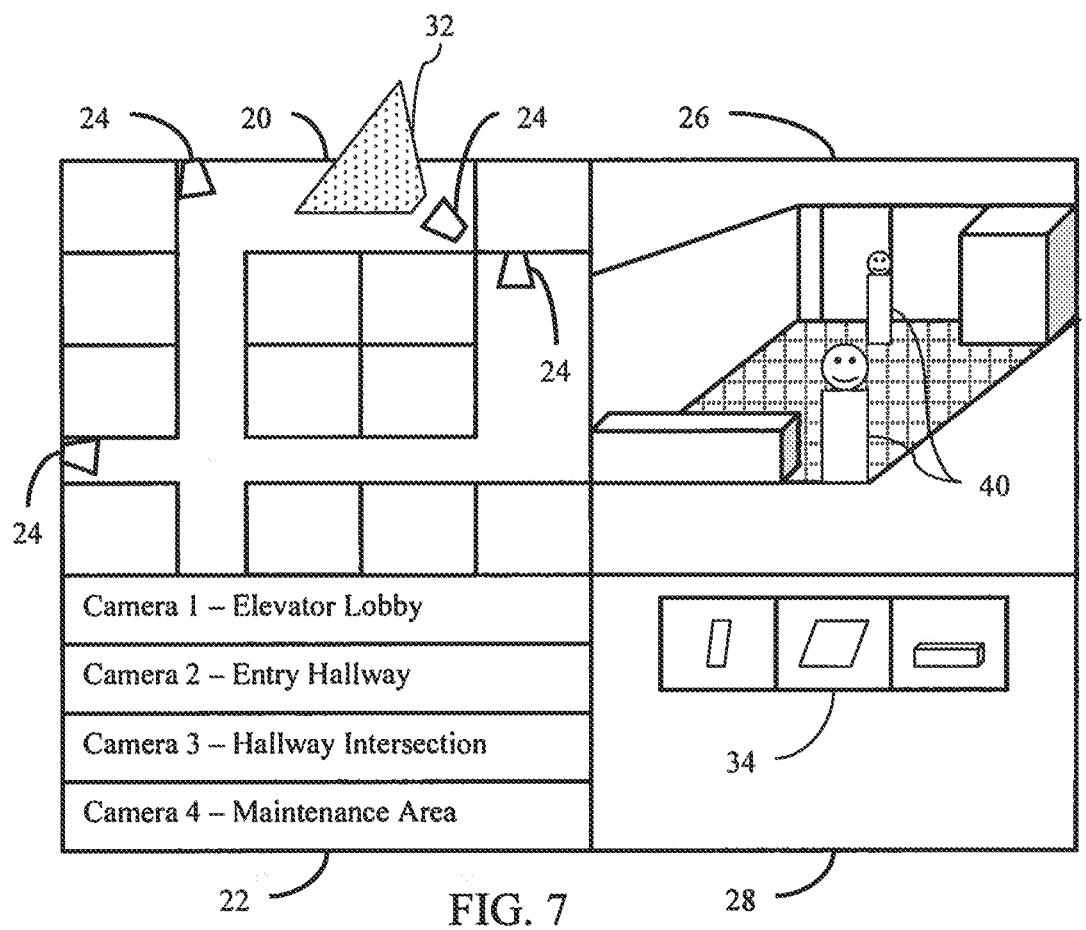
FIG. 7 illustrates an example graphic user interface for a scale stage of configuration.

In one embodiment represented in FIG. 7, the scale is set by placing representative people icons 40. The user positions the icons 40 and/or changes a height of the icons 40 based on the context of the image. The icons 40 are adjusted to represent the height of a typical person at the location in the image. The processor determines the scale for the camera from the location and height for the icons 40. Other scale settings may be used, such as inputting numerical values.

The scale may be semi-automatically set. For example, the camera image is again assumed to have no roll in orientation. Other embodiments may consider camera roll. The vanish point is calculated from the image. The scale changes associated with the vanish point is calculated and presented to the user to verify. In another approach, people are detected at different locations in the image. By assuming an average height and/or by averaging based on detecting multiple people, the foot location and height at each of multiple foot locations is determined. The scale is then set.

In one embodiment, the vanishing point is calculated. A background subtraction algorithm removes the background and returns blobs in each frame that correspond to moving persons. Background subtraction algorithms may not use high-level scene knowledge, so may return a single blob corresponding to a group of people. Regions with image noise or illumination changes may be detected as foreground. For computation of the vanishing line, the blob data is filtered to remove noisy detections. For example, the top (head) and the bottom (foot) pixel locations of each blob are located. The redundant entries that correspond to persons who are either stationary or moving very slowly are removed. The blobs whose height to width ratio is less than 1.5 or greater than 3.5 are removed. Since the camera is located at a certain height and has a tilt, this range accommodates the changes in the height-to-width ratio of humans due to perspective projection. The head and foot trajectories are smoothed using a Gaussian filter.

Once the data is filtered, well known data fitting algorithms such as the RANSAC algorithm, may be used to robustly fit lines to the head/foot locations of each blob across consecutive frames. Since a person might not always move in a straight line, lines are fit to about 15-20 frames at a time. Ideally, for each person, the head and foot locations should be parallel and the corresponding lines in the image should intersect at a point that lies on the horizontal vanishing line. By fitting lines to multiple such trajectories, multiple hypotheses of the points along the vanishing line are provided. Assuming that the vanishing line is horizontal to the image x-axis, the kernel density is computed over the intersection points. The y-coordinate of highest mode, $^{im}Y_v$ of this density gives the location of the horizontal vanishing line.

The height and tilt angle of the camera may be established as part of the configuration. The scale is provided based on the height and tilt angle. The graphic user interface solicits input from the user of the information. Alternatively, the height and title are calculated automatically.

Figure 10:
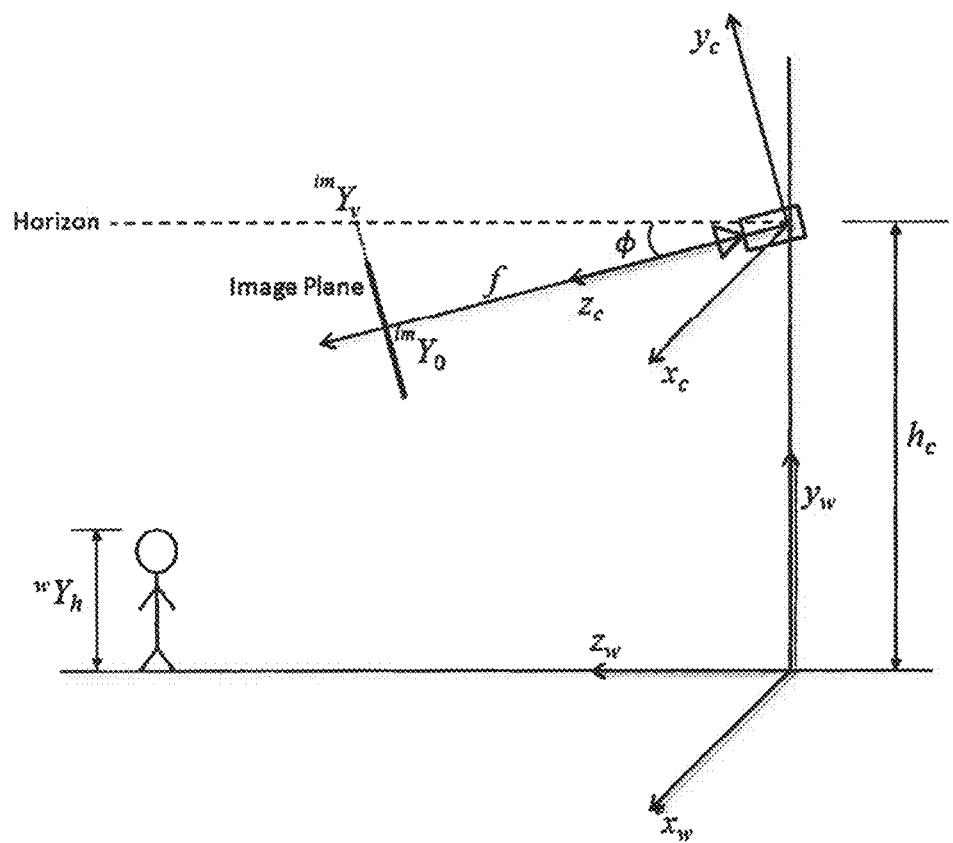
FIG. 10 illustrates example camera and world coordinate relationships.

Referring to FIG. 10, assuming the height of a person in the world to be $^{w}Y_h$, the height of the camera, $h_c$ is computed using the relation:

$$h_c = {}^w Y_h(({}^{im}Y_f - {}^{im}Y_v)/({}^{im}Y_f - {}^{im}Y_h))$$

where $^{im}Y_v$ is the location of the vanishing line in the image and $^{im}Y_h$ and $^{im}Y_f$ are coordinates of the head and foot of the person in the image. Many such estimates for height of the camera are computed using the head/foot locations of the foreground blobs. The average of all the estimates gives the final estimate for the camera height.

Given the location of the vanishing line $^{im}Y_v$, camera center ($^{im}X_0$, $^{im}Y_0$) and focal length f (in pixels), the tilt angle is computed as:

$$\phi = \tan^{-1}\{({}^{im}Y_0 - {}^{im}Y_v)/f\}$$

These two parameters provide the transformation between the camera and world coordinate frames.

In act 62 of FIG. 2, any relationship of a camera with one or more other cameras is received. The processor receives the interrelationship information in response to input from the user. The user indicates whether and/or how the cameras are related. The relationship may be for field of view overlap, for viewing a same location, or for being connected by traffic flow. For example, an exit/entry point (e.g., transition point) in one field of view may lead to a hallway with an exit/entry point at another end in a field of view of the other camera. The cameras are related such that traffic from one progresses to the other even though the fields of view do not overlap.

Figure 8:
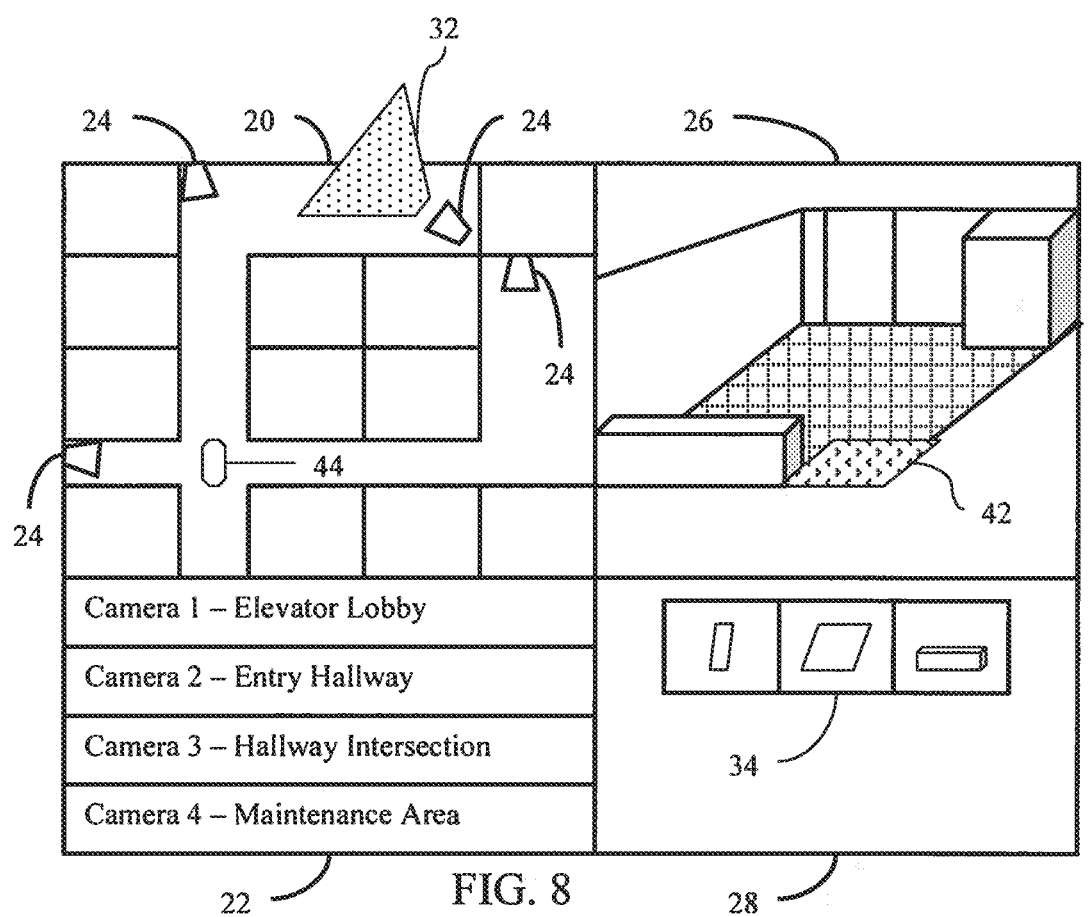
FIG. 8 illustrates an example graphic user interface for an interrelationship stage of configuration.

The input for the relationship is on the map or the image. FIG. 8 shows two examples. For the image, a polygon 42 is placed or a region painted. The polygon 42 represents overlap of fields of view. Alternatively, the polygon 42 represents a link point or selected hotspot that is linked to another camera. A dialog box or selection of the linked camera is performed on the map or the list region 22. In alternative embodiments, the overlap of the field of view is determined from an intersection of the field of view representations 32 on the map. The overlap may be calculated and added to the image as the polygon 42 based on the scale.

In another example, the user positions an icon, point, line, or shape on the map 44, such as the octagon 44. In response, the user is prompted to select two or more camera icons 24 or cameras in the list region 22 associated with the octagon 44, such as cameras with the same location in their field of view. Alternatively, the annotations of the hot spots are used. If the same hot spot (e.g., "Door A") is indicated for two or more cameras, the cameras are linked. By defining the same areas in different camera fields of view, the cameras are linked.

In one embodiment, a user selects a pair of cameras to be connected. The selection is made on the list or map. The selected cameras are highlighted, such as by changing color and showing the field of view graphic on the map for the selected cameras. A "link" button, menu selection, or other input is provided on the map or elsewhere in the display. By selecting or activating the link, the two or more currently selected cameras are linked. A visual indicator of linkage may be provided, such as a dashed line or other connector, a grouping in the list, or color coding. In response to selecting the cameras and indicating a link, the relationship is established and the link is shown on the map or in the list.

Other linkages may be used. Other inputs for establishing the inter-camera relationships may be used. In one embodiment, transition points between cameras are indicated with respect to both cameras. The transition points are locations where traffic from one camera's field of view is expected to immediately or eventually enter another camera's field of view. The inter-relationship configuration assigns the transition linkage. For example, the user positions a line or other marker in the image or selects a hotspot to indicate a transition point. A corresponding designation is made for another camera to link the cameras.

Different levels of assistance are provided to make the configuration easier for the user. For example, for the inter-camera relationship is provided using the manually based labeling discussed above. In other approaches or levels, a semi-automated system uses the map information. For example, by combining the camera direction and camera locations, the relationship between cameras is calculated and provided to user to confirm and/or adjust. In another approach or level of assistance, a vision-based algorithm indicates possible interconnections. For example, the vision algorithm tracks guards, maintenance personnel or others using a facility with the cameras. As the tracked people move through the building, the trajectory of their movement suggests how the cameras are connected. A person leaving one field of view and consistently then showing up next in another field of view indicates an interconnection.

In act 64 of FIG. 2, the configuration for each of the cameras is stored. After cycling through the series of cameras and/or configuration tasks, configuration information for multiple cameras is generated. The information is stored in a file, database, or memory, such as storing as an XML file. Using registration of the cameras (e.g., locations on a map), one or more defined regions (e.g., traffic patterns and/or hotspots), established scale, and/or interrelationship of cameras, the configuration of the cameras is provided. The configuration file or files are stored for use by the video analytics system for video surveillance.

FIG. 9 shows a system for configuring video analytics. The system is a host computer, man-machine interface, and/or graphic user interface for interaction with and configuration of a video surveillance system 11. The system includes the user input 12, display 14, memory 16, and processor 18. Additional, different, or fewer components may be provided.

The user input 12, display 14, processor 18, and memory 16 may be part of a computer, server, or other system for configuring the cameras 10 of the video surveillance system 11. A workstation or control station for the video surveillance system 11 may be used. Alternatively, a separate or remote device not part of the video surveillance system 11 is used. Instead, the configuration file is created and exported to the video surveillance system 11.

In one embodiment, the user input 12 and display 14 are part of a computer acting as a client for configuration, and the processor 18 and memory 16 are part of a server hosting the configuration tool. The client and server are interconnected by a network, such as an intranet or the Internet. The client may be a computer of the video surveillance system, and the server may be provided by a manufacturer, provider, host, or creator of the video surveillance system.

The video surveillance system 11 includes a plurality of cameras 10. The cameras are distributed throughout a region, such as building, floor of a building, warehouse, campus, complex, outdoor region, arena, airport, transportation region, hub, city, or tunnel system. The cameras 10 are installed and connected to a communications network. Each camera 10 captures a scene of an area. The video cameras 10 may observe the Open Network Video Interface Forum (ONVIF) specification. The camera video streams are coupled to a video processing unit, which is coupled to a video store and to a video content analytics (VCA) module. The VCA module outputs time-stamped video data and metadata to their respective stores. The VCA module generates and outputs metadata in accordance with algorithms. The video and metadata stores may be implemented as digital video recorders (DVRs) or network video recorders (NVRs) for storage and replay. Video data is encoded and stored. The stream-based metadata may be stored with video. Other arrangements for video surveillance may be provided.

The display 14 is a CRT, LCD, projector, plasma, printer, smart phone or other now known or later developed display device for displaying the graphic user interface. For example, the display 14 displays the example screens shown in FIGS. 3-8. The display 14 assists in configuring the cameras by presenting user interfaces and corresponding input options.

The display 14 is a touch screen in one embodiment. The touch screen facilitates user interaction with the configuration tool. For example, the touch screen is used to input information using the graphics user interface. Alternatively or additionally, the user input 12 is provided separately from the display.

The user input 12 is a keyboard, mouse, track ball, touch screen, buttons, sliders, touch pad, and/or other now known or later developed computer input device. The user input 12 operates in conjunction with the display 14 for interacting relative to the graphical user interface. The user input 12 is used to control the selections and inputs to the graphical user interface. Configuration information is received from the user through the user input 12. As the graphical user interface solicits input or provides input capabilities, the user uses the user input 12 to configure.

The instructions, user input, graphic user interface, configurations, and/or other information are stored in a non-transitory computer readable memory, such as the memory 16. The memory 16 is an external storage device, RAM, ROM, database, and/or a local memory (e.g., solid state drive or hard drive). The same or different computer readable media may be used for the instructions and other data. The memory 16 may be implemented using a database management system (DBMS) managed by the processor 18 and residing on a memory, such as a hard disk, RAM, or removable media. Alternatively, the memory 16 is internal to the processor 18 (e.g. cache). The memory 16 stores input options, graphics, code for the user interface, links, configuration files, configuration options, camera data, and/or user input information. The created configuration for each of the cameras is stored.

The instructions for implementing the processes, methods and/or techniques discussed herein are provided on non-transitory computer-readable storage media or memories, such as a cache, buffer, RAM, removable media, hard drive or other computer readable storage media (e.g., the memory 16). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

A program may be uploaded to, and executed by, the processor 18 comprising any suitable architecture. Likewise, processing strategies may include multiprocessing, multitasking, parallel processing and the like. The processor 18 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 18 is one or more processors in a network.

The processor 18 interacts with the user input 12 and the display 14 to provide the graphic user interface for configuring the cameras. The graphic user interface information and the resulting configuration are stored in the memory 16. The computer processing performed by the processor 18 may be implemented in various forms of hardware, software, firmware, special purpose processors, or a combination thereof. Some embodiments are implemented in software as a program tangibly embodied on a non-transitory program storage device.

In one embodiment, the processor 18 is a server. The processor 18 responds to input and provides output to a client device. The graphic user interface is served to the client for soliciting configuration information. The received input or configuration information is used by the processor 18 to generate the configurations for the cameras. The processor 18 implements the configuration workflow in a client-server architecture. The graphic user interface provides an intuitive system presentation, and the processor 18 consolidates the user input and generates the configuration data for input to or operation of the surveillance system 11.

The processor 18 is configured to cause the user interface to include a map of the region indicating locations for the cameras, a view from a selected camera of the plurality of cameras, and text listing the cameras. Additional, different, or fewer components may be provided in the graphic user interface. Other outputs of the graphics user interface may be presented.

The processor 18 is configured to receive selection of cameras and associated characteristics. Input configuration information is received for each of the selected cameras based on the graphic user interface. For example, a view direction relative to the map, a region of interest marked in the view, and a location of a height marker in the view are received. Additional, different, or less information may be received by the processor 18.

The processor 18 is configured to generate the configuration as a function of the selection and configuration information. The received input is formatted as appropriate for storage and/or use by the video analytics. For example, metadata indicating a relationship between at least two of the cameras in generated in an XML format. Other formats and/or data may be used for the configuration information.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for configuring for video analytics, the method comprising:
   registering, by a processor in response to first inputs from a user input of locations on a map, cameras relative to the map;
   for each of the cameras, defining a region by the processor based on a second user input indicating an area on an image captured by the camera, wherein the region is in the image captured by the camera;
   establishing, by the processor, a relationship between two or more of the cameras; and
   storing a configuration for each of the cameras, the configuration being a function of the location relative to the map, the region, the area, and the relationship.

2. The method of claim 1 wherein registering comprises setting a position of the cameras relative to the map.

3. The method of claim 1 wherein registering comprises textually labeling a view area for each of the cameras.

4. The method of claim 1 wherein registering comprises receiving an indication of a view direction for each of the cameras on the map while the image for the camera is displayed with the map.

5. The method of claim 1 wherein defining comprises defining the region as a floor surface.

6. The method of claim 1 wherein defining comprises receiving the second input as painted on the image captured by the camera.

7. The method of claim 1 wherein defining comprises the second input indicating a hotspot associated with entry or exit points in the image.

8. The method of claim 7 wherein indicating the hotspot comprises receiving the second input as indicating a floor surface and a polygon on the image, the hotspot comprising an intersection of the polygon with the floor surface.

9. The method of claim 1 further comprising establishing, for each camera, a scale in response to user indication of a position of a height icon in the image.

10. The method of claim 1 wherein establishing the relationship comprises receiving a third input from a user of selection of the two or more cameras and indication of a link between the selected two or more cameras.

11. The method of claim 1 wherein establishing the relationship comprises receiving a third input from a user as common labeling of the region in each of the two or more cameras.

12. The method of claim 1 further comprising:
   automatically calculating the region, the relationship, or the region and the relationship with the processor wherein the second input is confirmation of the automatic calculation.

* * * * *